United States Patent
Trainer (10) Patent No.: US 10,027,238 B2
(45) Date of Patent: Jul. 17, 2018

(54) ELECTRICAL ASSEMBLY

(71) Applicant: General Electric Technology GmbH, Baden (CH)

(72) Inventor: David Reginald Trainer, Stafford (GB)

(73) Assignee: General Electric Technology GmbH, Baden (CH)

( * ) Notice: Subject to any disclaimer, the term of this patent is extended or adjusted under 35 U.S.C. 154(b) by 423 days.

(21) Appl. No.: 14/899,528

(22) PCT Filed: Jun. 16, 2014

(86) PCT No.: PCT/EP2014/062595
§ 371 (c)(1),
(2) Date: Dec. 17, 2015

(87) PCT Pub. No.: WO2014/202543
PCT Pub. Date: Dec. 24, 2014

(65) Prior Publication Data
US 2016/0141969 A1 May 19, 2016

(30) Foreign Application Priority Data
Jun. 18, 2013 (EP) .................................... 13275142

(51) Int. Cl.
*H02M 5/45* (2006.01)
*H02M 5/44* (2006.01)
(Continued)

(52) U.S. Cl.
CPC ................ *H02M 5/44* (2013.01); *H02J 3/02* (2013.01); *H02J 3/36* (2013.01); *H02M 2007/4835* (2013.01); *Y02E 60/60* (2013.01)

(58) Field of Classification Search
CPC ... H02M 5/44; H02M 5/45; H02M 2007/4835
(Continued)

(56) References Cited

U.S. PATENT DOCUMENTS

| 4,151,585 A | 4/1979 | Bowles |
| 4,692,667 A * | 9/1987 | Nilssen ............. H05B 41/2851 |
| | | 315/209 R |

(Continued)

FOREIGN PATENT DOCUMENTS

| CN | 101258670 A | 9/2008 |
| CN | 101512865 A | 8/2009 |

(Continued)

OTHER PUBLICATIONS

International Search Report and Written Opinion, PCT/EP2014/062595, Alstom Technology Ltd, 9 pages (dated Nov. 20, 2014).
(Continued)

*Primary Examiner* — Adolf Berhane
*Assistant Examiner* — Nusrat Quddus
(74) *Attorney, Agent, or Firm* — GE Global Patent Operation; Scott R. Stanley (57) ABSTRACT

An electrical assembly includes a DC tap including first and second tap terminals that are respectively connectable to first and second DC power transmission media, the DC tap including a tap limb extending between the first and second tap terminals and having two limb portions separated by a third tap terminal connectable to an electrical load, each tap limb portion including a DC blocking capacitor. The assembly further includes a current return configured to electrically interconnect the or each AC terminal to the third tap terminal, a converter unit, and a controller configured to selectively control the converter unit to generate at least one first non-fundamental frequency alternating current component at the or each AC terminal and modify the or each first non-fundamental frequency alternating current component to enable the DC tap to draw power from the DC electrical network for supply to the electrical load.

21 Claims, 6 Drawing Sheets

(51) Int. Cl.
*H02J 3/02* (2006.01)
*H02J 3/36* (2006.01)
*H02M 7/483* (2007.01)

(58) Field of Classification Search
USPC ...... 363/37–53, 55, 123, 125, 127, 131, 132
See application file for complete search history.

(56) References Cited

U.S. PATENT DOCUMENTS

| | | | | | |
|---|---|---|---|---|---|
| 5,155,672 | A | * | 10/1992 | Brown | G05F 1/20 323/255 |
| 5,515,264 | A | * | 5/1996 | Stacey | H02M 7/49 363/132 |
| 5,644,482 | A | * | 7/1997 | Asplund | H02J 3/36 363/35 |
| 7,499,291 | B2 | * | 3/2009 | Han | H02M 7/19 363/17 |
| 8,378,646 | B2 | * | 2/2013 | Shimada | H02M 3/33507 307/66 |
| 8,638,074 | B2 | * | 1/2014 | Babcock | H02M 1/425 323/207 |
| 8,737,096 | B2 | * | 5/2014 | Asplund | H02J 3/36 363/35 |
| 2009/0225570 | A1 | | 9/2009 | Pereira et al. | |
| 2013/0308351 | A1 | * | 11/2013 | MacLennan | H01F 27/027 363/34 |
| 2013/0314956 | A1 | * | 11/2013 | Tang | H02M 7/003 363/54 |
| 2014/0198534 | A1 | * | 7/2014 | Jovcic | H02M 3/33584 363/16 |
| 2015/0035466 | A1 | * | 2/2015 | MacLennan | H01F 27/2823 318/494 |
| 2015/0092459 | A1 | * | 4/2015 | Bergdahl | H03H 19/004 363/39 |
| 2015/0333612 | A1 | * | 11/2015 | Hasler | H02M 1/12 363/39 |
| 2015/0340967 | A1 | * | 11/2015 | Jiang-Hafner | H02M 7/483 363/39 |
| 2016/0204689 | A1 | * | 7/2016 | Wennerstrom | H02P 6/14 318/400.26 |

FOREIGN PATENT DOCUMENTS

| | | |
|---|---|---|
| CN | 102460933 A | 5/2012 |
| GB | 1 297 639 A | 11/1972 |
| GB | 1 550 718 A | 8/1979 |
| WO | WO 2011/098117 A1 | 8/2011 |
| WO | WO-2012/025142 A1 | 3/2012 |

OTHER PUBLICATIONS

Lima, A.G. et al., "HVMDC: a new concept to feed small loads," AC and DC Power Transmission, International Conference, London, United Kingdom, pp. 120-125 (Jan. 1, 1999).

Aghaebrahimi, M.R. et al., "Small Power Tapping from HVDC Transmission Systems: A Novel Approach," IEEE Transactions on Power Delivery, vol. 12, No. 4, pp. 1698-1703 (Oct. 1, 1997).

Verdolin, R. et al., "Induced Overvoltages on an AC-DC Hybrid Transmission System," IEEE Transactions on Power Delivery, vol. 10, No. 3, pp. 1514-1524 (Jul. 1, 1995).

Machine translation and First Office Action and Search issued in connection with corresponding CN Application No. 201480045858.8 dated Aug. 1, 2017.

* cited by examiner

ELECTRICAL ASSEMBLY

CROSS REFERENCE TO RELATED APPLICATIONS

The present application is a National Stage of International Application No. PCT/EP2014/062595, filed Jun. 16, 2014, which claims priority to European Application No. 13275142, filed Jun. 18, 2013, which is incorporated herein by reference in its entirety.

This invention relates to an electrical assembly.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC electrical networks operating at different frequencies. In any such power transmission network, converters are required at each interface between AC and DC power to effect the required conversion, and one such form of converter is a voltage source converter (VSC).

According to an aspect of the invention, there is provided an electrical assembly comprising:

a voltage source converter including first and second DC terminals and at least one AC terminal, the first and second DC terminal being respectively connectable to first and second DC power transmission media connected to a DC electrical network, the or each AC terminal being connectable to an AC electrical network;

a DC tap including first and second tap terminals, the first and second tap terminals being respectively connectable to the first and second DC power transmission media, the DC tap including a tap limb extending between the first and second tap terminals, the tap limb having first and second tap limb portions separated by a third tap terminal, each tap limb portion including a respective DC blocking capacitor, the third tap terminal being connectable to an electrical load;

a current return path configured to electrically interconnect the or each AC terminal to the third tap terminal;

a converter unit; and a controller configured to selectively control the converter unit to generate at least one first non-fundamental frequency alternating current component at the or each AC terminal to drive a non-fundamental frequency alternating current to flow through the current return path and in the third tap terminal, and to selectively control the voltage source converter to modify the or each first non-fundamental frequency alternating current component at the or each AC terminal so as to form a first current flowing between the first DC terminal and the first tap terminal and to form a second current flowing between the second DC terminal and the second tap terminal, each of the first and second currents including a direct current component and at least one second non-fundamental frequency alternating current component, so as to enable the DC tap to draw power from the DC electrical network for supply to the electrical load.

A DC power transmission medium may be any medium that is capable of transmitting electrical power between two or more electrical elements. Such a medium may be, but is not limited to, a submarine DC power transmission cable, an overhead DC power transmission line or cable and an underground DC power transmission cable. Such an electrical element may be, but is not limited to, a DC power source, a load, a DC terminal of a DC power grid, or a DC electrical network.

The configuration of the controller to selectively control the converter unit and voltage source converter in the manner set out above, together with the arrangement of the voltage source converter and DC tap, enables the converter unit and voltage source converter to be controlled to cause the first and second currents to respectively flow through the first and second tap limb portions. The direct current components of the first and second currents act to discharge, and thereby reduce the voltage of, the DC blocking capacitors of the first and second tap limb portions respectively.

However, since the tap limb is arranged to be connected in parallel with the DC electrical network, the combined voltage of the DC blocking capacitors must be maintained at the DC voltage of the DC electrical network. Therefore, a charging direct current component flows from the DC electrical network into the DC blocking capacitors in order to oppose the direct current component of each of the first and second currents and thereby maintain the combined voltage of the DC blocking capacitors. This means that each DC blocking capacitor, and therefore the DC tap, only experiences a non-fundamental frequency alternating current. The flow of the charging direct current component from the DC electrical network into the DC blocking capacitors enables the DC tap to draw power from the DC electrical network for supply to the electrical load.

The inclusion of the converter unit and the DC tap in the electrical assembly therefore enables the supply of low levels of power (e.g. 20 MW at 20 kV) using the voltage source converter and the DC power transmission media that are normally operated, in use, to supply high levels of power (e.g. 600 MW at 600 kV). This provides a way of transmitting and distributing power at a level that is suitable for consumption by end-users who are located in remote areas through which the DC power transmission media passes.

In contrast omission of the converter unit and the DC tap would require the installation of a device (such as a high voltage DC to DC converter) with a high voltage step-down capability at each remote location to step-down the voltage level of the power transmitted in the DC power transmission media in order to transmit and distribute power at a level that is suitable for consumption by the aforementioned end-users. The installation of a plurality of such devices would significantly add hardware size, weight and cost and thereby adversely affect the economic feasibility of the associated power transmission and distribution network.

In addition, since the inclusion of the converter unit and the DC tap in the electrical assembly obviates the need to alter the ratings of the voltage source converter and the DC power transmission media to render them capable of supplying low levels of power, adding the converter unit and the DC tap to existing voltage source converters and DC power transmission media to form the electrical assembly does not require significant modification of the existing voltage source converters and DC power transmission media.

In use, the voltage source converter is controlled to generate a fundamental frequency alternating current component at the or each AC terminal in order to transmit the high levels of power via the DC power transmission media.

Preferably the controller is configured to selectively control the voltage source converter to generate a fundamental frequency alternating current component at the or each AC terminal while the converter unit generates the or each first non-fundamental frequency alternating current component at the or each AC terminal. The operation of the electrical assembly in this manner enables simultaneous transmission of the high and low levels of power through the DC power transmission media, thus improving the efficiency of the electrical assembly.

The configuration of the electrical assembly according to the invention therefore results in a economical, space-saving and efficient electrical assembly that is capable of transmitting and distributing low levels of power using hardware that are normally operated to supply high levels of power.

In use, the converter unit may be operated to generate any type of first non-fundamental frequency alternating current component at the or each AC terminal to drive a non-fundamental frequency alternating current to flow through the current return path and in the third tap terminal. For example, the or each first non-fundamental frequency alternating current component may be a harmonic frequency alternating current component and/or the or each first non-fundamental frequency alternating current component may be a zero phase sequence alternating current component (e.g. $3^{rd}$, $9^{th}$, $15^{th}$ harmonic frequency alternating current components and so on).

In embodiments of the invention, the voltage source converter may include at least one converter limb extending between the first and second DC terminals, the or each converter limb having first and second converter limb portions separated by an AC terminal, each converter limb portion including at least one switching element, the or each switching element in each converter limb portion being switchable to switch the corresponding converter limb portion in and out of circuit between the AC terminal and the corresponding DC terminal to control the configuration of an AC voltage at the corresponding AC terminal.

The configuration of the voltage source converter in this manner means that, during operation of the voltage source converter to transfer power between the AC electrical network and the DC power transmission media, the switching elements of the converter limb portions may be switched to alternately switch the converter limb portions into circuit between the AC terminal and the corresponding DC terminal over a duty cycle. This means that the flow of current in the voltage source converter alternates between the converter limb portions over the duty cycle. As such, when one of the converter limb portions is switched into circuit between the AC terminal and the corresponding DC terminal, the other of the converter limb portions is switched out of circuit between the AC terminal and the corresponding DC terminal.

The alternating flow of current between the converter limb portions over the duty cycle results in "chopping" of the or each first non-fundamental frequency alternating current component at the corresponding AC terminal to create the first and second currents flowing between the DC terminals and the tap terminals.

Optionally the controller is configured to selectively control switching of the switching elements in the converter limb portions to alternately switch the converter limb portions into circuit between the AC terminal and the corresponding DC terminal in a nominal 50:50 duty cycle. Controlling switching of the switching elements in the converter limb portions in this manner enables the alternating current at the AC terminal to be divided so that the positive half of the alternating current at the AC terminal flows in one of the first and second converter limb portions and the negative half of the alternating current at the AC terminal flows in the other of the first and second converter limb portions, thus simplifying the control of the voltage source converter to modify the or each first non-fundamental frequency alternating current component at the or each AC terminal to form the first and second currents.

The configuration of each converter limb portion may vary as long as it includes at least one switching element that is switchable to switch the corresponding converter limb portion in and out of circuit between the AC terminal and the corresponding DC terminal to control the configuration of an AC voltage at the corresponding AC terminal.

For example, each converter limb portion may include at least one module, the or each module including at least one switching element and at least one energy storage device, the or each switching element and the or each energy storage device in the or each module combining to selectively provide a voltage source.

The configuration of the or each module may vary as long as the or each switching element and the or each energy storage device in the or each module can combine to selectively provide a voltage source.

In an exemplary arrangement of the or each module, the or each module may include two pairs of switching elements connected in parallel with an energy storage device in a full-bridge arrangement to define a 4-quadrant bipolar module that can provide negative, zero or positive voltage and can conduct current in two directions.

In a further exemplary arrangement of the or each module, the or each module may include a pair of switching elements connected in parallel with an energy storage device in a half-bridge arrangement to define a 2-quadrant unipolar module that can provide zero or positive voltage and can conduct current in two directions.

In a still further exemplary arrangement of the or each module, the or each module may include first and second sets of series-connected current flow control elements connected in parallel with at least one energy storage device, each set of current flow control elements including a switching element to selectively direct current through the energy storage device and a passive current check element to limit current flow through the rationalised module to a single direction.

The inclusion of the or each module in each converter limb portion provides the or each converter limb with a reliable means of controlling the configuration of the AC voltage at the corresponding AC terminal.

Each converter limb portion may include a plurality of series-connected modules that defines a chain-link converter. The structure of the chain-link converter permits build up of a combined voltage across the chain-link converter, which is higher than the voltage available from each of its individual modules, via the insertion of the energy storage devices of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. As such the chain-link converter is capable of providing a wide range of complex voltage waveforms to enable the configuration of a high quality AC voltage at the or each AC terminal.

At least one switching element may include at least one self-commutated switching device. The or each self-commutated switching device may be an insulated gate bipolar transistor, a gate turn-off thyristor, a field effect transistor, an injection-enhanced gate transistor, an integrated gate commutated thyristor or any other self-commutated switching device. The number of switching devices in each switching element may vary depending on the required voltage and current ratings of that switching element.

The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy, e.g. a capacitor, fuel cell or battery.

In embodiments of the invention, the voltage source converter may include the converter unit. In such embodiments in which the voltage source converter includes at least one converter limb, the converter unit may include the or each converter limb.

Therefore, in use, the voltage source converter is controllable to carry out the function of the converter unit, i.e. generation of at least one first non-fundamental frequency alternating current component at the or each AC terminal to drive a non-fundamental frequency alternating current to flow through the current return path and in the third tap terminal. The integration of the converter unit with the voltage source converter reduces the amount of hardware required for the operation of the electrical assembly, thus providing further savings in terms of hardware size, weight and cost.

In embodiments of the invention in which the voltage source converter includes a converter limb, the inclusion of a chain-link converter in each converter limb portion is compatible with the integration of the converter unit with the voltage source converter, because the capability of the chain-link converter to provide a wide range of complex voltage waveforms renders it suitable for generating an alternating current that includes the or each first non-fundamental frequency alternating current component at the corresponding AC terminal.

In other embodiments of the invention, the converter unit may be separate from the voltage source converter. In such embodiments of the invention, the current return path may include the converter unit.

In such embodiments, the configuration of the converter unit may vary as long as the converter unit is able to be controlled, in use, to generate the or each first non-fundamental frequency alternating current component at the or each AC terminal, and the connection of the converter unit to the voltage source converter in the electrical assembly may vary as long as the converter unit is able to be controlled, in use, to generate at least one first non-fundamental frequency alternating current component at the or each AC terminal to drive a non-fundamental frequency alternating current to flow through the current return path and in the third tap terminal. For example, the converter unit may include at least one module, the or each module including at least one switching element and at least one energy storage device, the or each switching element and the or each energy storage device in the or each module combining to selectively provide a voltage source.

Separating the converter unit from the voltage source converter means that the voltage source converter is not required to generate the or each first non-fundamental frequency alternating current component at the or each AC terminal. Therefore, the voltage source converter and converter unit can be optimised from a hardware and control perspective to perform their respective functions, thus improving the efficiency and reliability of the electrical assembly.

The configuration of the current return path may vary depending on the availability of hardware, particularly when the electrical assembly is based on the adaptation of existing voltage source converters and DC power transmission media. For example, the current return path may include at least one of:

a ground return (e.g. single wire earth return);
an electrically conductive line or cable;
an electrically conductive sheath (e.g. a metal sheath) for enclosing the or each DC power transmission medium;
a lightning conductor (e.g. a grounded lightning conductor fitted to a DC power transmission tower).

The configuration of the electrical assembly may vary as long as the voltage source converter and converter unit are arranged to enable the converter unit to be controlled, in use, to generate at least one first non-fundamental frequency alternating current component at the or each AC terminal to drive a non-fundamental frequency alternating current to flow through the current return path and in the third tap terminal.

For example, in embodiments of the invention, the electrical assembly may include a plurality of phase elements connected in a star configuration in which a first end of each phase element is connected to a common junction, the current return path configured to electrically interconnect the common junction and the third tap terminal, the voltage source converter including a plurality of AC terminals, each AC terminal being connected to a second end of a respective one of the plurality of phase elements. In use, the operation of the converter unit to generate at least one first non-fundamental frequency alternating current component at the or each AC terminal results in a non-fundamental frequency AC voltage appearing at the common junction to drive the non-fundamental frequency alternating current to flow through the current return path and in the third tap terminal.

In embodiments of the invention employing the use of a plurality of phase elements, each phase element may include a first transformer winding.

When a transformer is required to be connected between the AC electrical network and the or each AC terminal of the voltage source converter, the use of transformer windings as the plurality of phase elements eliminates the need for additional hardware to form the plurality of phase elements, thus providing further savings in terms of hardware size, weight and cost.

In such embodiments, the electrical assembly may further include a plurality of second transformer windings, each first transformer winding being mutually coupled with a respective one of the plurality of second transformer windings, a first end of each second transformer winding being connected to a second end of a different second transformer winding such that the interconnection of the second transformer windings define a closed loop.

The arrangement of the second transformer windings in the above manner defines a connection without a neutral wire (such as a delta connection). The lack of a neutral wire in the connection prevents the zero phase sequence alternating current components from travelling into a neutral wire. This means that the zero phase sequence current components become trapped in the closed loop formed by the second transformer windings and thus cannot enter the connected AC electrical network. As such, the generation of a zero phase sequence alternating current component at the or each AC terminal has negligible effect on the connected AC electrical network.

Each first transformer winding may define a secondary winding of a transformer, while each second transformer winding may define either a primary or tertiary winding of a transformer.

In further embodiments of the invention, the electrical assembly may include at least one impedance element, the or each impedance element forming a current control element for controlling the or each first non-fundamental frequency alternating current component. In such embodiments of the invention, the current return path may include at least one impedance element.

The inclusion of at least one current control element in the electrical assembly enhances the capability of the converter unit to control the generation of the or each first non-fundamental frequency alternating current component at the or each AC terminal.

In embodiments of the invention employing the use of a plurality of phase elements and in which each phase element includes a first transformer winding, each first transformer winding may define an impedance element that forms a current control element for controlling the or each first non-fundamental frequency alternating current component.

In embodiments of the invention, the DC tap may further include a transformer, the third tap terminal being connectable to the electrical load via the transformer.

The inclusion of a transformer in the DC tap permits modification of the voltage level of the power supplied by the DC tap to match the voltage requirements of the electrical load. The required step-up or step-down capability and hence the size of such a transformer can be reduced by controlling the converter unit to configure the non-fundamental frequency alternating current flowing in the third tap terminal so that the voltage level of the power supplied by the DC tap closely matches the voltage requirements of the electrical load.

In further embodiments of the invention, the DC tap may further include a frequency converter.

The inclusion of the frequency converter in the DC tap permits conversion of the non-fundamental frequency alternating current at the third tap terminal into a fundamental frequency alternating current before the DC tap supplies AC power to the electrical load. In addition, the use of a harmonic frequency alternating current component, especially a zero phase sequence alternating current component, as the or each first non-fundamental frequency alternating current component at the or each AC terminal makes it more straightforward to alter the frequency of the non-fundamental frequency alternating current at the third tap terminal to produce a fundamental frequency alternating current.

In such embodiments, the frequency converter may be a 1-phase to multi-phase frequency converter (such as a 1-phase, 150 Hz to 3-phase, 50 Hz frequency converter). The use of such a frequency converter permits modification of the number of phases of the power supplied by the DC tap to match the number of phases of the power required of the electrical load.

Preferred embodiments of the invention will now be described, by way of non-limiting examples only, with reference to the accompanying drawings in which.

Figure 1:
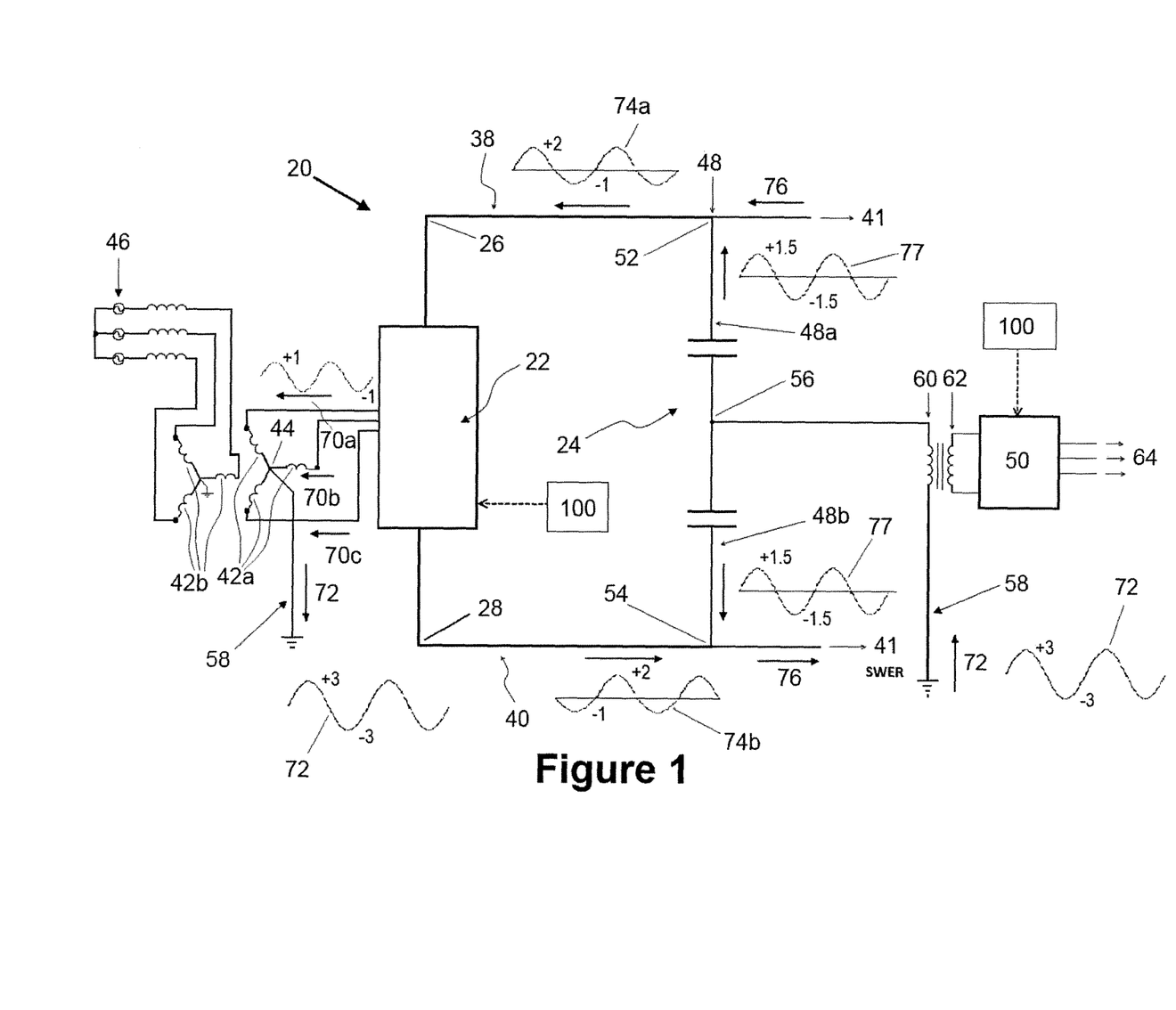
FIG. 1 shows, in schematic form, an electrical assembly according to a first embodiment of the invention.

A first electrical assembly 20 according to a first embodiment of the invention is shown in FIG. 1.

The electrical assembly includes a voltage source converter 22 and a DC tap 24.

Figure 2:
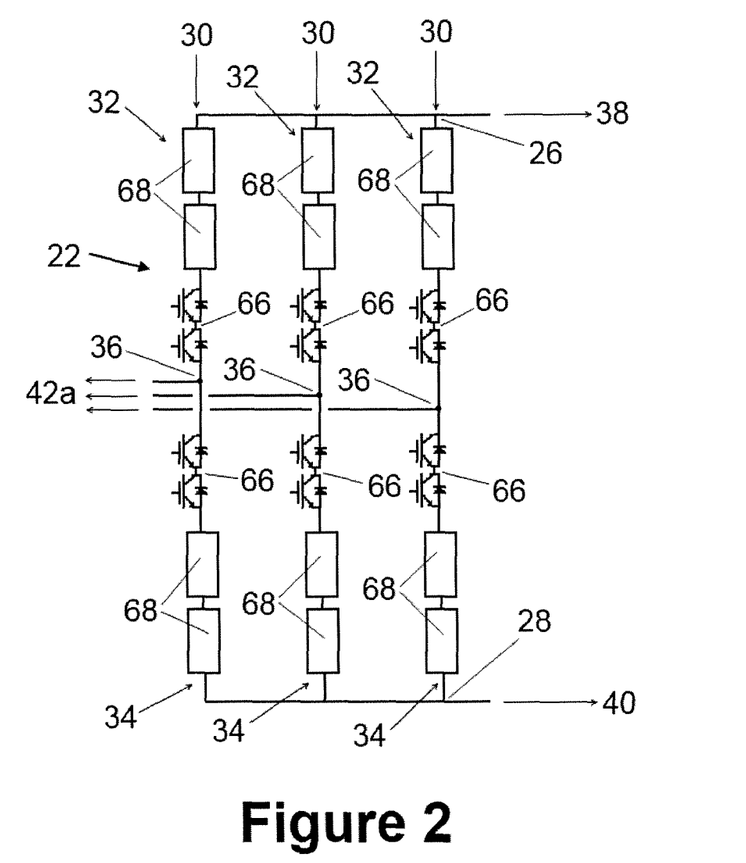
FIG. 2 shows, in schematic form, a voltage source converter forming part of the electrical assembly of FIG. 1.

The voltage source converter 22 includes first and second DC terminals 26,28 and three converter limbs 30, as shown in FIG. 2. Each converter limb 30 extends between the first and second DC terminals 26,28 and has first and second converter limb portions 32,34 separated by an AC terminal 36. In particular, the first converter limb portion 32 is connected between the first DC terminal 26 and AC terminal 36, while the second converter limb portion 34 is connected between the second DC terminal 28 and AC terminal 36.

In use, the first and second DC terminals 26,28 of the voltage source converter 22 are respectively connected to first and second DC power transmission lines 38,40 connected to a DC electrical network 41, the first DC power transmission line 38 being connected to a first terminal of the DC electrical network 41, the first terminal carrying a positive DC voltage and the second DC power transmission line 40 being connected to a second terminal of the DC electrical network 41, the second terminal carrying a negative DC voltage.

The first electrical assembly 20 further includes a plurality of phase elements. Each phase element includes a first transformer winding 42a. The plurality of phase elements are connected in a first star configuration in which a first end of each phase element is connected to a common junction 44. Each AC terminal 36 is connected to a second end of a respective one of the plurality of phase elements.

The first electrical assembly 20 further includes a plurality of second transformer windings 42b. The plurality of second transformer windings 42b are connected in a second star configuration in which a first end of each second transformer winding 42b is connected to a common junction. In use, each second transformer winding 42b is connected to a respective phase of a three-phase AC electrical network 46.

Each first transformer winding 42a defines a secondary winding of a first transformer, while each second transformer winding 42b defines a primary winding of the first transformer. Each first transformer winding 42a is mutually coupled with a respective one of the plurality of second transformer windings 42b. In this manner, in use, each AC terminal 36 is connected to a respective phase of a three-phase AC electrical network 46.

The arrangement of each first transformer winding 42a in the phase element means that each first transformer winding 42a can define an impedance element that forms a current control element for controlling an alternating current flowing in the corresponding phase element. This enhances the capability of each converter limb 30 to control the generation of an alternating current at the corresponding AC terminal 36.

The DC tap 24 includes a tap limb 48, a second transformer and a frequency converter 50.

The tap limb 48 extends between first and second tap terminals 52,54. In use, the first tap terminal 52 is connected to the first DC power transmission line 38 and the second tap terminal 54 is connected to the second DC power transmission line 40 such that the tap limb 48 forms a branch that extends between the first and second DC power transmission lines 38,40. The tap limb 48 has first and second tap limb portions 48a,48b separated by a third tap terminal 56. Each tap limb portion 48a,48b includes a DC blocking capacitor.

The first electrical assembly 20 further includes a current return path 58 in the form of a single wire earth return (SWER) that is configured to electrically interconnect the common junction 44 of the first star configuration and the third tap terminal 56 of the DC tap 24.

It is envisaged that, in other embodiments of the invention, the configuration of the current return path may vary depending on the availability of hardware, particularly when the first electrical assembly is based on the adaptation of existing voltage source converters and DC power transmission lines. For example, in addition to or in place of the single wire earth return, the current return path may include at least one of:
- an electrically conductive line or cable;
- an electrically conductive sheath (e.g. a metal sheath) for enclosing the or each DC power transmission medium;
- a lightning conductor (e.g. a grounded lightning conductor fitted to a DC power transmission tower).

The second transformer includes mutually coupled primary and secondary transformer windings 60,62. The primary transformer winding 60 of the second transformer is connected to the third tap terminal 56 of the DC tap 24 and is connected in the current return path 58 such that any current flowing in the current return path 58 passes through the primary transformer winding 60 of the second transformer.

The frequency converter 50 is a 150 Hz, 1-phase to 50 Hz 3-phase frequency converter 50. The frequency converter 50 includes input AC terminals for carrying a 1-phase alternating current and output AC terminals for carrying a 3-phase alternating current. The secondary transformer winding 62 of the second transformer is connected across the input AC terminals of the frequency converter 50 while, in use, the output AC terminals of the frequency converter 50 are connected to an AC electrical load 64.

FIG. 2 shows, in schematic form, the structure of each converter limb 30 of the voltage source converter 22.

In each converter limb 30, each of the first and second converter limb portions 32,34 includes a director switch 66 connected in series with a plurality of series-connected modules 68.

Each director switch 66 is in the form of a plurality of series-connected switching elements. It is envisaged that, in other embodiments of the invention, each director switch may include a single switching element.

Each module 68 includes two pairs of switching elements and an energy storage device in the form of a capacitor. The pairs of switching elements are connected in parallel with the capacitor in a full-bridge arrangement.

Each switching element of the director switch 66 and modules 68 in each converter limb portion 32,34 includes a single switching device. Each switching element further includes a passive current check element that is connected in anti-parallel with each switching device.

Each switching device is in the form of an insulated gate bipolar transistor (IGBT). It is envisaged that, in other embodiments of the invention, each IGBT may be replaced by a gate turn-off thyristor, a field effect transistor, an injection-enhanced gate transistor, an integrated gate commutated thyristor or any other self-commutated switching device. The number of switching devices in each switching element may vary depending on the required voltage rating of that switching element.

Each passive current check element includes a passive current check device in the form of a diode. It is envisaged that, in other embodiments, each diode may be replaced by any other device that is capable of limiting current flow in only one direction. The number of passive current check devices in each passive current check element may vary depending on the required voltage rating of that passive current check element.

It is further envisaged that, in other embodiments of the invention, each capacitor may be replaced by another type of energy storage device that is capable of storing and releasing energy, e.g. a fuel cell or battery.

The plurality of series-connected modules 68 in each converter limb portion 32,34 defines a chain-link converter.

The capacitor of each module 68 is selectively bypassed or inserted into the chain-link converter by changing the states of the switching elements. This selectively directs current through the capacitor or causes current to bypass the capacitor, so that the module 68 provides a negative, zero or positive voltage.

The capacitor of the module 68 is bypassed when the switching elements in the module 68 are configured to form a short circuit in the module 68. This causes current in the chain-link converter to pass through the short circuit and bypass the capacitor, and so the module 68 provides a zero voltage, i.e. the module 68 is configured in a bypassed mode.

The capacitor of the module 68 is inserted into the chain-link converter when the switching elements in the module 68 are configured to allow the current in the chain-link converter to flow into and out of the capacitor. The capacitor then charges or discharges its stored energy so as to provide a non-zero voltage, i.e. the module 68 is configured in a non-bypassed mode. The full-bridge arrangement of the module 68 permits configuration of the switching elements in the module 68 to cause current to flow into and out of the capacitor in either direction, and so the module 68 can be configured to provide a negative or positive voltage in the non-bypassed mode.

In this manner the pairs of switching elements are connected in parallel with the capacitor in a full-bridge arrangement to define a 4-quadrant bipolar module 68 that can provide negative, zero or positive voltage and can conduct current in two directions.

It is possible to build up a combined voltage across the chain-link converter, which is higher than the voltage available from each of its individual modules 68, via the insertion of the capacitors of multiple modules 68, each providing its own voltage, into the chain-link converter. In this manner switching of the switching elements in each module 68 causes the chain-link converter to provide a stepped variable voltage source, which permits the generation of a voltage waveform across the chain-link converter using a step-wise approximation. As such the chain-link converter is capable of providing a wide range of complex voltage waveforms.

It is envisaged that, in other embodiments of the invention, each module 68 may be replaced by another type of module that includes at least one switching element and at least one energy storage device, the or each switching element and the or each energy storage device in the or each module combining to selectively provide a voltage source.

In one exemplary alternative arrangement, each module may include a pair of switching elements connected in parallel with an energy storage device in a half-bridge arrangement to define a 2-quadrant unipolar module that can provide zero or positive voltage and can conduct current in two directions. In another exemplary alternative arrangement, each module may include first and second sets of series-connected current flow control elements connected in parallel with at least one energy storage device, each set of current flow control elements including a switching element to selectively direct current through the energy storage device and a passive current check element to limit current flow through the rationalised module to a single direction.

The first electrical assembly 20 further includes a controller 100 configured to selectively control the voltage source converter 22 and to selectively control the frequency converter 50 of the DC tap 24.

Operation of the first electrical assembly 20 of FIG. 1 is described as follows, with reference to FIGS. 2 and 3.

As described above, in use, the first DC terminal 26 of the voltage source converter 22 is connected to the first DC power transmission line 38 connected to a first terminal of the DC electrical network 41, the first terminal carrying a positive DC voltage, the second DC terminal 28 of the voltage source converter 22 is connected to the second DC power transmission line 40 connected to a second terminal of the DC electrical network 41, the second terminal carrying a negative DC voltage, and each AC terminal 36 is connected to a respective phase of a three-phase AC electrical network 46.

For the purposes of this specification, where appropriate, the operation of the voltage source converter 22 is described with reference to one of its converter limbs 30. It will be appreciated that the described operation of one of the converter limbs 30 of the voltage source converter 22 applies mutatis mutandis to the operation of the other two converter limbs 30.

The director switches 66 in the first and second converter limb portions 32,34 dictate which converter limb portion 32,34 is in conduction and thereby is in use to control the configuration of the AC voltage at the AC terminal 36. The configuration of the AC voltage at the AC terminal 36 is controlled by combining first and second AC voltage components as follows.

To construct the first AC voltage component, the first converter limb portion 32 is in a conducting state by way of its director switch 66 being switched on, and the controller 100 controls the switching of the switching elements of each module 68 in the first converter limb portion 32 to add and subtract voltage steps to, i.e. "push up" and "pull down", the positive DC voltage at the first DC terminal 26. The first AC voltage component is constructed to be in the form of a positive, half-sinusoidal voltage waveform while a positive half of an alternating current flows into the AC terminal 36. Meanwhile the second converter limb portion 34 is in a non-conducting state by way of its director switch 66 being switched off.

To construct the second AC voltage component, the second converter limb portion 34 is in a conducting state by way of its director switch 66 being switched on, and the controller 100 controls the switching of the switching elements of each module 68 in the second converter limb portion 34 to add and subtract voltage steps to, i.e. "push up" and "pull down", the negative DC voltage at the second DC terminal 28. The second AC voltage component is constructed to be in the form of a negative, half-sinusoidal voltage waveform while a negative half of an alternating current flows into the AC terminal 36. Meanwhile the first converter limb portion 32 is in a non-conducting state by way of its director switch 66 being switched off.

In addition, the controller 100 controls the switching of the switching elements of the director switches 66 of the converter limb portions 32,34 to alternately switch the converter limb portions 32,34 into circuit between the AC terminal 36 and the corresponding DC terminal in a nominal 50:50 duty cycle. This means that the flow of current in the voltage source converter 22 alternates between the converter limb portions 32,34 in a nominal 50:50 duty cycle.

During the construction of the first and second AC voltage components, the controller 100 also controls the switching of the switching elements of each module 68 in each chain-link converter to control the configuration of the AC voltage at the AC terminal 36, the AC voltage being in the form of a sinusoidal AC voltage that includes both fundamental and $3^{rd}$ harmonic frequency AC voltage components.

In the first star configuration, the voltage at its common junction 44 is equal to the average of a plurality of phase voltages, each of which falls across a respective one of the plurality of phase elements. Therefore, the configuration of the AC voltage at the AC terminal 36 to include both fundamental and $3^{rd}$ harmonic frequency AC voltage components means that the fundamental frequency AC voltage components cancel each other at the common junction 44 of the first star configuration and the $3^{rd}$ harmonic frequency AC voltage components, as a result of their zero-phase sequence nature, are summed at the common junction 44 of the first star configuration. Therefore, a $3^{rd}$ harmonic frequency AC voltage appears at the common junction 44 of the first star configuration.

The $3^{rd}$ harmonic frequency AC voltage appearing at the common junction 44 of the first star configuration drives the flow of a first non-fundamental alternating current component in the form of a $3^{rd}$ harmonic frequency alternating current component 70a,70b,70c at each AC terminal 36 and therefore drives a $3^{rd}$ harmonic frequency alternating current 72 to flow through the current return path 58 and in the third tap terminal 56. The $3^{rd}$ harmonic frequency alternating current component 70a,70b,70c at each AC terminal 36 has a positive peak of +1 and a negative peak of −1, and so the $3^{rd}$ harmonic frequency alternating current 72 in the current return path 58 has a positive peak of +3 and negative peak of −3.

Therefore, the voltage source converter 22 is controlled to generate an alternating current flowing at each AC terminal 36 that includes both fundamental and $3^{rd}$ harmonic frequency alternating current components 70a,70b,70c.

It is envisaged that, in other embodiments of the invention, instead of being a $3^{rd}$ harmonic frequency alternating current component, the first non-fundamental frequency alternating current component at the AC terminal may be any other harmonic frequency and/or zero-phase sequence alternating current component.

As described above, the flow of current in the voltage source converter 22 alternates between the converter limb portions 32,34 in a nominal 50:50 duty cycle. Controlling the switching of the switching elements in the converter limb portions 32,34 in this manner enables the alternating current at the AC terminal 36 to be divided so that the positive half of the alternating current at the AC terminal 36 flows in the first converter limb portion 32 and the negative half of the alternating current at the AC terminal 36 flows in the second converter limb portion 34. This means that the alternating flow of current between the converter limb portions 32,34 over the duty cycle results in "chopping" of the fundamental and $3^{rd}$ harmonic frequency alternating current components 70a,70b,70c at the corresponding AC terminal 36.

The "chopping" of the 3$^{rd}$ harmonic frequency alternating current components 70a,70b,70c at the corresponding AC terminal 36 forms a first current 74a that flows between the first DC terminal 26 and the first tap terminal 52, and a second current 74b that flows between the second DC terminal 28 and the second tap terminal 54. Each of the first and second currents 74a,74b includes a direct current component and a second non-fundamental frequency alternating current component.

At any given point in time during the operation of the voltage source converter 22, the first current 74a flowing between the first DC terminal 26 and the first tap terminal 52 is the sum of the 3$^{rd}$ harmonic frequency alternating current components flowing in the first converter limb portions 32 of the converter limbs 30, while the second current 74b flowing between the second DC terminal 28 and the second tap terminal 54 is the sum of the 3$^{rd}$ harmonic frequency alternating current components flowing in the second converter limb portions 34 of the converter limbs 30.

Figure 3:
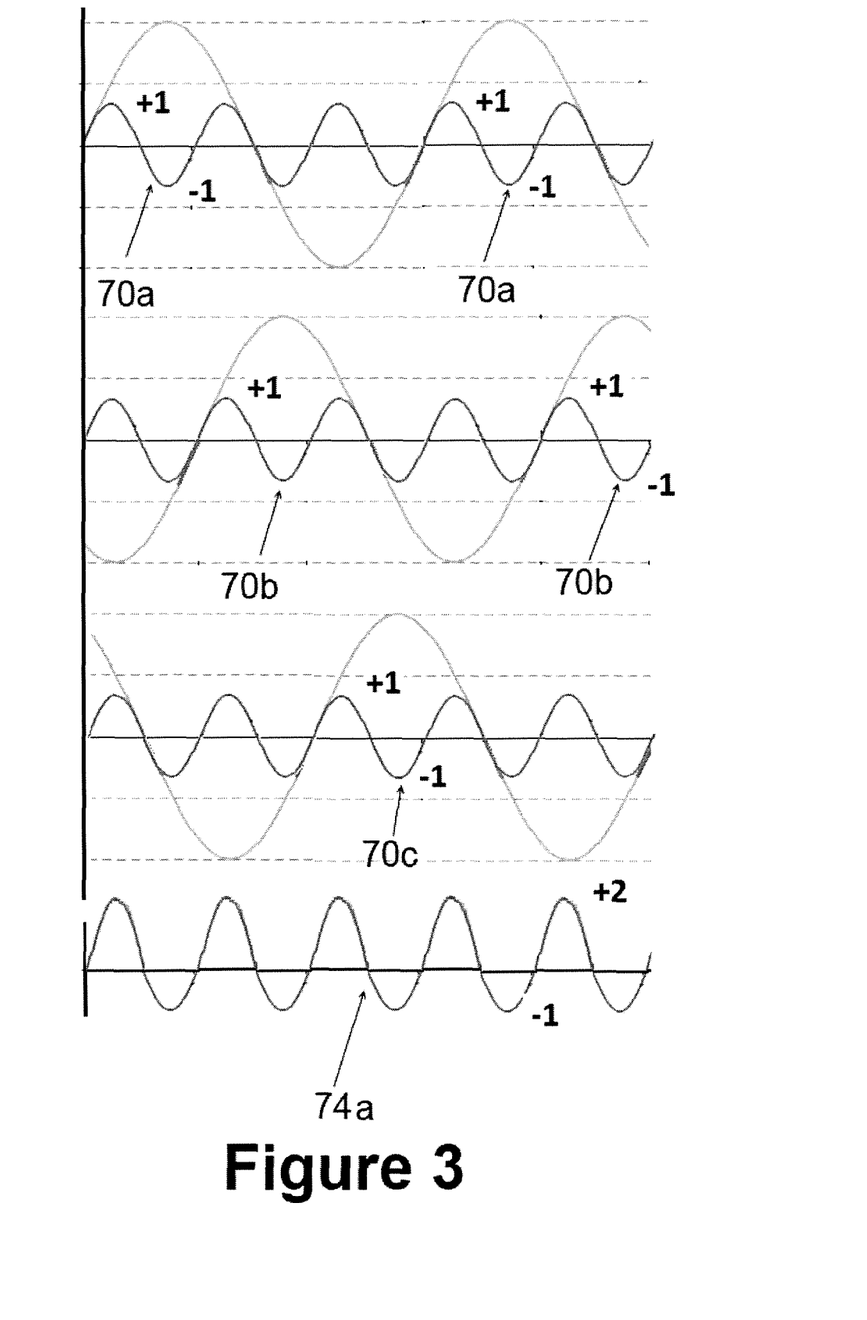
FIG. 3 illustrates, in graph form, the operation of the voltage source converter of FIG. 2 to modify $3^{rd}$ harmonic frequency alternating current components appearing at its AC terminals to form a first current.

It can be seen from FIG. 3 that the first current 74a flowing between the first DC terminal 26 and the first tap terminal 54 has a positive peak of +2 and a negative peak of −1 due to the summation of the 3$^{rd}$ harmonic frequency alternating current components flowing in the first converter limb portions 34 of the converter limbs 30.

In this manner the converter limbs 30 form a converter unit that can be controlled to generate a first non-fundamental frequency alternating current component 70a,70b,70c at each AC terminal 36, which is then "chopped" (i.e. modified) by the voltage source converter to form the first and second currents 74a,74b that flow between the first and second DC terminals 26,28 and the first and second tap terminals 52,54. The capability of the chain-link converter in each converter limb portion 32,34 to provide a wide range of complex voltage waveforms renders it suitable for generating an alternating current that includes both fundamental and 3$^{rd}$ harmonic frequency alternating current components 70a,70b,70c at the corresponding AC terminal 36.

The operation of the voltage source converter 22 as set out above means that a first current 74a containing a direct current component and a 3$^{rd}$ harmonic frequency alternating current component flows between the first DC terminal 26 and the first tap terminal 52, and a second current 74b containing a direct current component and a 3$^{rd}$ harmonic frequency alternating current component flows between the second DC terminal 28 and the second tap terminal 54.

The operation of the voltage source converter in the manner set out above causes the first and second currents 74a,74b to respectively flow through the first and second tap limb portions 48a,48b. The direct current components of the first and second currents 74a,74b act to discharge, and thereby reduce the voltage of, the DC blocking capacitors of the first and second tap limb portions 48a,48b respectively.

However, since the tap limb 48 is arranged to be connected in parallel with the DC electrical network 41, the combined voltage of the DC blocking capacitors must be maintained at the DC voltage of the DC electrical network 41. Therefore, a charging direct current component 76 flows from the DC electrical network 41 into the DC blocking capacitors in order to oppose the direct current component of each of the first and second currents 74a,74b and thereby maintain the combined voltage of the DC blocking capacitors. This means that each DC blocking capacitor, and therefore the DC tap 24, only experiences a non-fundamental frequency alternating current 77 with a positive peak of +1.5 and a negative peak of −1.5. The flow of the charging direct current component 76 from the DC electrical network 41 into the DC blocking capacitors enables the DC tap 24 to draw power from the DC electrical network 41.

The flow of the non-fundamental frequency alternating current 72 in the current return path 58 causes a 1-phase alternating current to flow into the input AC terminals of the frequency converter 50 by way of the mutual coupling of the primary and secondary transformer windings 60,62 of the second transformer. The controller controls the frequency converter 50 to convert the 1-phase alternating current into a 3-phase alternating current that flows out of the output AC terminals of the frequency converter 50 into the AC electrical load 64. In this manner the DC tap 24 supplies power to the AC electrical load 64.

Meanwhile the "chopping" of the fundamental frequency alternating current component at the corresponding AC terminal 36 forms a direct current (not shown) that flows in the first DC terminal 26 and the first DC power transmission line 38, and forms another direct current (not shown) that flows in the second DC terminal 28 and the second DC power transmission line 40. This enables transmission of high levels of power through the first and second DC power transmission lines 38,40.

The inclusion of the converter unit (i.e. the converter limbs 30 of the first electrical assembly 20) and the DC tap 24 in the first electrical assembly 20 therefore enables the supply of the low levels of power (e.g. 20 MW at 20 kV) using the voltage source converter 22 and the DC power transmission lines 38,40 that are normally operated, in use, to supply the high levels of power (e.g. 600 MW at 600 kV). This provides a way of transmitting and distributing power at a level that is suitable for consumption by end-users who are located in remote areas through which the DC power transmission lines 38,40 passes.

In contrast, if the DC tap 24 is omitted from the first electrical assembly 20 and the converter limbs 30 are not operated as a converter unit to generate a first non-fundamental frequency alternating current component at each AC terminal 36 to drive the non-fundamental frequency alternating current to flow through the current return path and in the third tap terminal, the installation of a device (such as a high voltage DC to DC converter) with a high voltage step-down capability would be required at each remote location to step-down the voltage level of the power transmitted in the DC power transmission lines 38,40 in order to transmit and distribute power at a level that is suitable for consumption by the aforementioned end-users. The installation of a plurality of such devices would significantly add hardware size, weight and cost and thereby adversely affect the economic feasibility of the associated power transmission and distribution network.

In addition, since the inclusion of the converter unit and the DC tap 24 in the first electrical assembly 20 obviates the need to alter the ratings of the voltage source converter 22 and the DC power transmission lines 38,40 to render them capable of supplying low levels of DC power, adding the converter unit and the DC tap 24 to existing voltage source converters and DC power transmission lines to form the first electrical assembly 20 does not require significant modification of the existing voltage source converters and DC power transmission lines.

The simple configuration of the DC tap 24 as set out above provides a simple, cost-efficient and reliable mechanism for providing AC power to the AC electrical load 64.

The inclusion of the second transformer in the DC tap 24 permits modification of the voltage level of the power supplied by the DC tap 24 to match the voltage requirements of the AC electrical load 64. The required step-up or step-down capability and hence the size of such a transformer can be reduced by controlling the converter unit to configure the non-fundamental frequency alternating current 72 flowing in the third tap terminal 56 so that the voltage level of the power supplied by the DC tap 24 closely matches the voltage requirements of the AC electrical load 64.

The inclusion of the frequency converter 50 in the DC tap 24 permits conversion of the non-fundamental frequency alternating current 72 at the third tap terminal 56 into a fundamental frequency alternating current before the DC tap 24 supplies AC power to the AC electrical load 64. In addition, the use of a $3^{rd}$ harmonic frequency alternating current component 70a,70b,70c as each first non-fundamental frequency alternating current component at each AC terminal 36 makes it more straightforward to alter the frequency of the non-fundamental frequency alternating current 72 at the third tap terminal 56 to produce a fundamental frequency alternating current. Furthermore, the use of the frequency converter 50 permits modification of the number of phases of the power supplied by the DC tap 24 to match the number of phases of the power required of the AC electrical load 64.

The configuration of the first electrical assembly 20 according to the invention therefore results in a economical, space-saving and efficient first electrical assembly 20 that is capable of transmitting and distributing low levels of power using hardware that are normally operated, in use, to supply high levels of power. Moreover, the integration of the converter unit with the voltage source converter 22 reduces the amount of hardware required for the operation of the first electrical assembly 20, thus providing further savings in terms of hardware size, weight and cost.

It is envisaged that, in other embodiments of the invention, the topology of the voltage source converter may vary as long as the voltage source converter includes at least one DC terminal and at least one AC terminal, and is capable of controlling the configuration of the AC voltage at the AC terminal, the AC voltage being in the form of a sinusoidal AC voltage that includes both fundamental and $3^{rd}$ harmonic frequency AC voltage components. For example, each converter limb portion may omit the director switch.

It is also envisaged that, in other embodiments of the invention, the number of converter limbs in the voltage source converter may vary. In one embodiment, the voltage source converter may include a single converter limb. In another embodiment, the voltage source converter may include a plurality of converter limbs and a plurality of phase elements, the number of converter limbs and phase elements corresponding to the number of phases of the multi-phase AC electrical network.

In still other embodiments of the invention, it is envisaged that each DC power transmission line may be replaced by any other medium that is capable of transmitting electrical power between two or more electrical elements. Such a medium may be, but is not limited to, a submarine DC power transmission cable, an overhead DC power transmission line or cable and an underground DC power transmission cable. Such an electrical element may be, but is not limited to, a DC power source, a load, a DC terminal of a DC power grid, or a DC electrical network.

Figure 4:
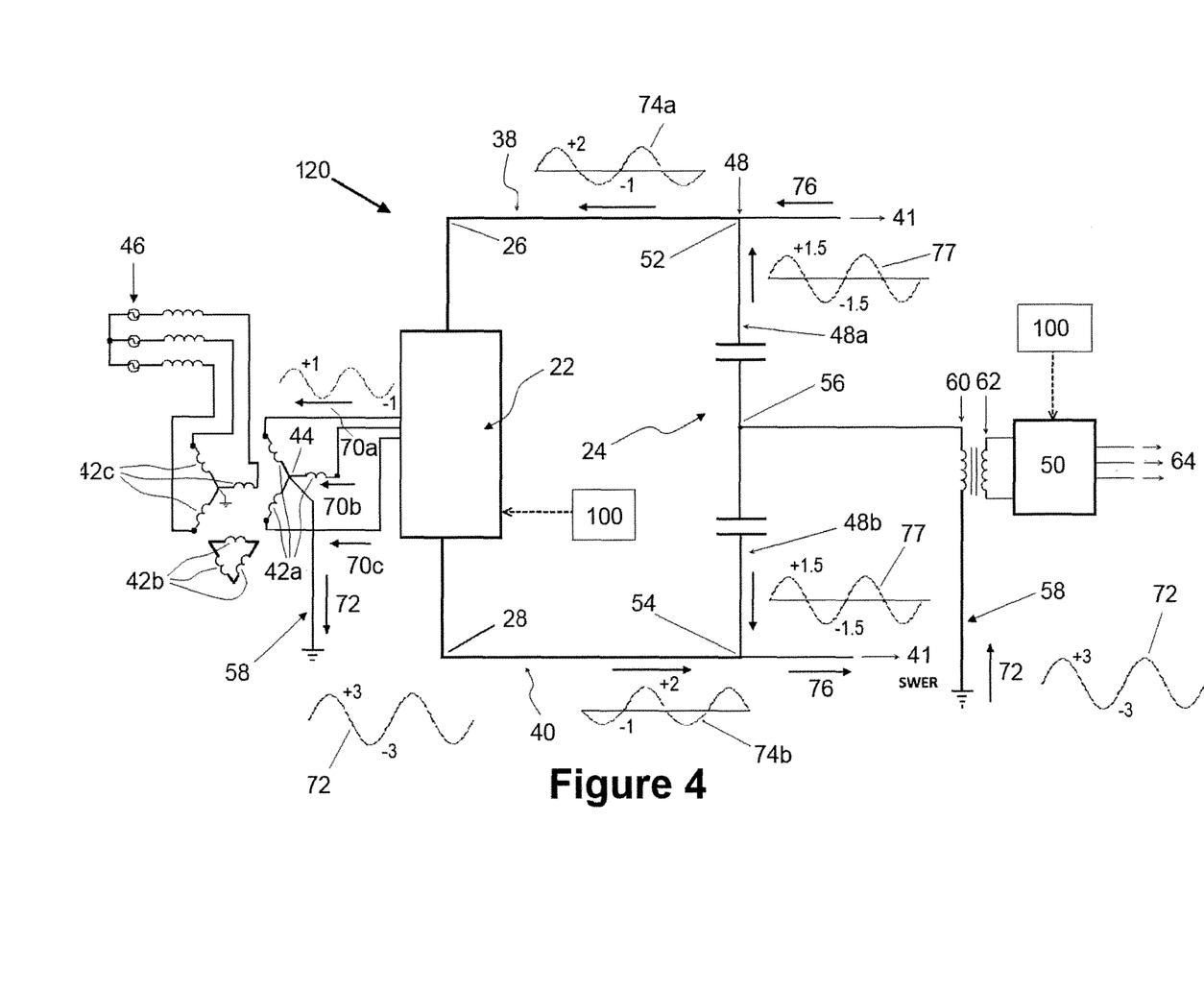
FIG. 4 shows, in schematic form, an electrical assembly according to a second embodiment of the invention.

A second electrical assembly 120 according to a second embodiment of the invention is shown in FIG. 4. The second electrical assembly 120 of FIG. 4 is similar in structure and operation to the first electrical assembly 20 of FIG. 1, and like features share the same reference numerals.

The second electrical assembly 120 differs from the first electrical assembly 20 in that in the second electrical assembly 120, a first end of each second transformer winding 42b is connected to a second end of a different second transformer winding 42b such that the interconnection of the second transformer windings 42b define a closed loop, and the second transformer windings 42b define a tertiary winding of the first transformer.

The second electrical assembly 120 further differs from the first electrical assembly 20 in that the second electrical assembly 120 further includes a plurality of third transformer windings 42c. The plurality of third transformer windings 42c are connected in a third star configuration in which a first end of each third transformer winding 42c is connected to a common junction. The third transformer windings 42c define the primary winding of the first transformer. In use, each third transformer winding 42c is connected to a respective phase of the three-phase AC electrical network 46.

Each first transformer winding 42a is mutually coupled with a respective one of the plurality of third transformer windings 42c. Each second transformer winding 42b is mutually coupled with a respective one of the plurality of third transformer windings 42c. In this manner, in use, each AC terminal 36 is connected to a respective phase of a three-phase AC electrical network 46.

The arrangement of the second transformer windings 42b in the above manner defines a delta connection. The lack of a neutral wire in the delta connection prevents the $3^{rd}$ harmonic frequency alternating current components 70a, 70b,70c, due to their zero phase sequence nature, from travelling into a neutral wire. This means that the $3^{rd}$ harmonic frequency alternating current components 70a, 70b,70c become trapped in the closed loop formed by the second transformer windings 42b and thus cannot enter the connected AC electrical network 46. As such, the generation of a $3^{rd}$ harmonic frequency alternating current component 70a,70b,70c at each AC terminal 36 has negligible effect on the connected AC electrical network 46.

It is envisaged that, in other embodiments of the invention, the second electrical assembly may omit the plurality of third transformer windings, and the plurality of second transformer windings may define the primary winding of the first transformer, each second transformer winding being connected to a respective phase of the three-phase AC electrical network.

Figure 5:
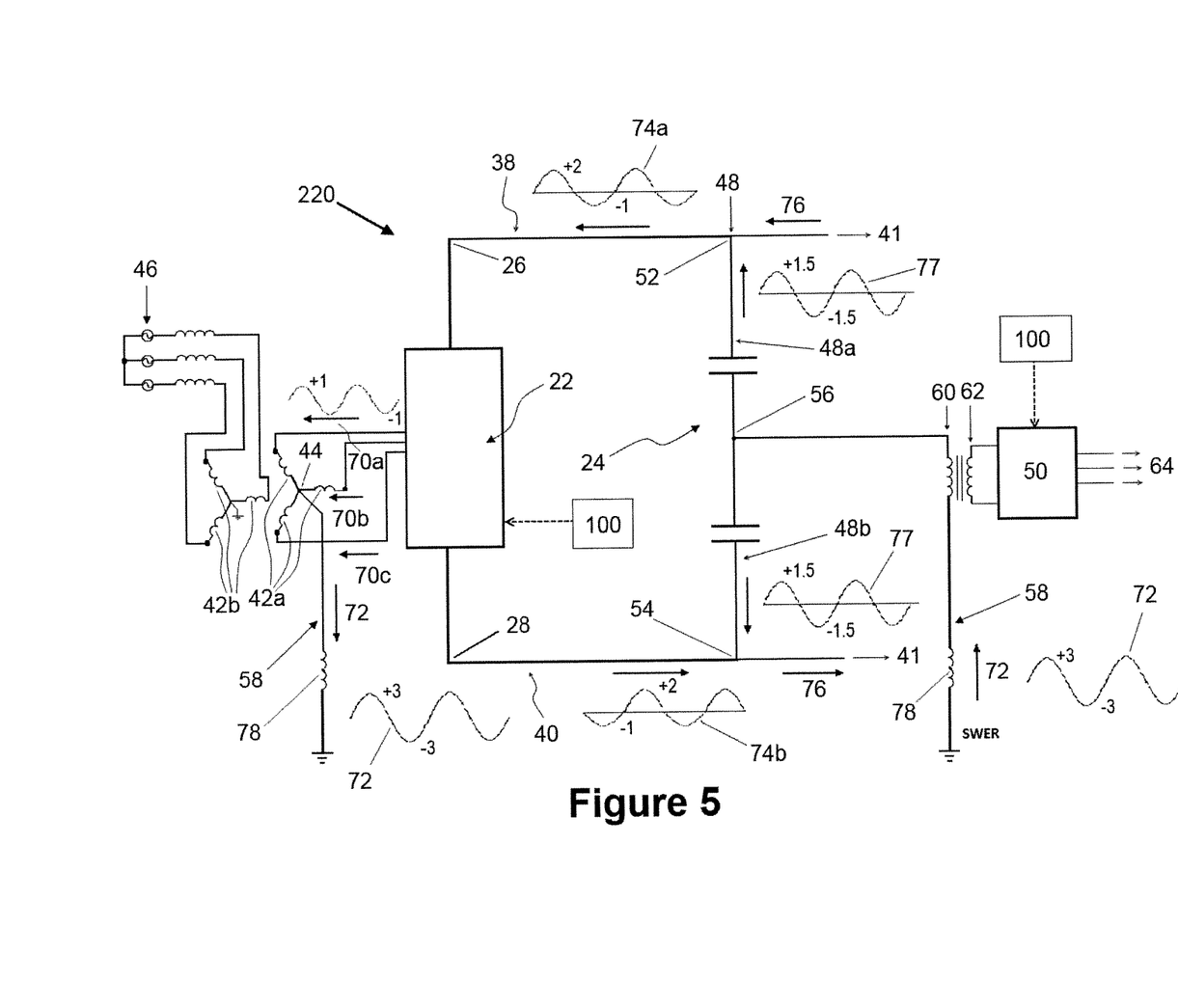
FIG. 5 shows, in schematic form, an electrical assembly according to a third embodiment of the invention.

A third electrical assembly 220 according to a third embodiment of the invention is shown in FIG. 5. The third electrical assembly 220 of FIG. 5 is similar in structure and operation to the first electrical assembly 20 of FIG. 1, and like features share the same reference numerals.

The third electrical assembly 220 differs from the first electrical assembly 20 in that the third electrical assembly 220 further includes two additional impedance elements 78. Each additional impedance element 78 is in the form of an inductor and is connected in the current return path 58. In particular, one of the additional impedance elements 78 is connected to the common junction 44 of the first star configuration and the other of the additional impedance elements 78 is connected to the third tap terminal 56 of the DC tap 24 via the primary transformer winding 60 of the second transformer.

It is envisaged that, in other embodiments of the invention, the third electrical assembly may include one of the additional impedance elements and omit the other of the additional impedance elements such that the remaining additional impedance element is connected to the common junction of the first star configuration or to the third tap terminal of the DC tap via the primary transformer winding of the second transformer.

Each additional impedance element 78 forms a current control element for controlling an alternating current flowing at each AC terminal 36. Therefore, the inclusion of the additional impedance elements 78 further enhances the capability of each converter limb 30 to control the generation of a first non-fundamental frequency alternating current component at the corresponding AC terminal 36.

Figure 6:
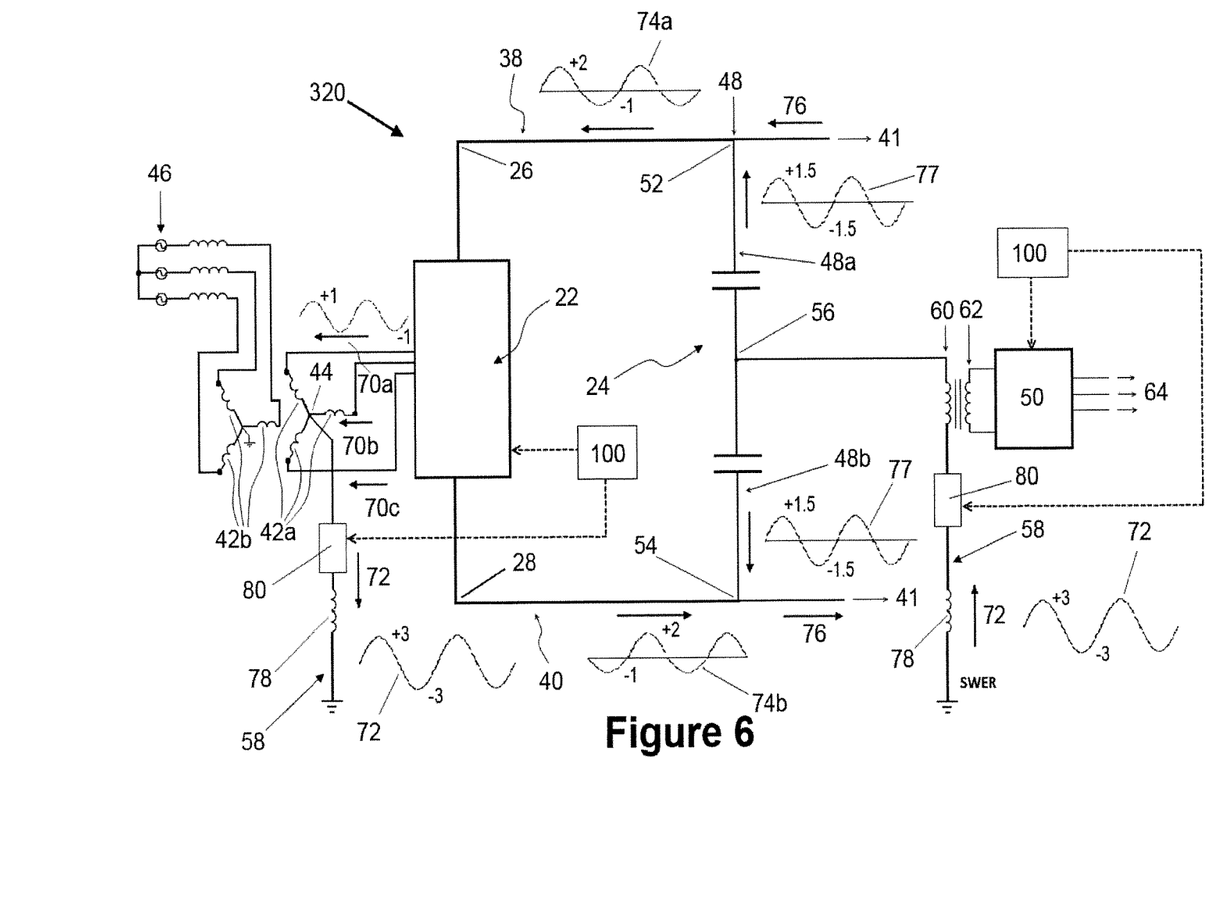
FIG. 6 shows, in schematic form, an electrical assembly according to a fourth embodiment of the invention.

A fourth electrical assembly 320 according to a fourth embodiment of the invention is shown in FIG. 6. The fourth electrical assembly 320 of FIG. 6 is similar in structure and operation to the third electrical assembly 220 of FIG. 5, and like features share the same reference numerals.

The fourth electrical assembly 320 differs from the third electrical assembly 220 in that the fourth electrical assembly 320 includes two converter units 80, each converter unit 80 of the fourth electrical assembly 320 is separate from the voltage source converter 22, and the three converter limbs 30 do not form a converter unit 80.

In the fourth electrical assembly 320, the controller 100 is configured to selectively control each converter unit 80.

In the embodiment shown, each converter unit 80 is in the form of a chain-link converter and is connected in the current return path 58. In particular, one of the converter units 80 is connected to the common junction 44 of the first star configuration and the other of the converter units 80 is connected to the third tap terminal 56 of the DC tap 24 via the primary transformer winding 60 of the second transformer.

During the construction of the first and second AC voltage components, the controller 100 controls the switching of the switching elements of each module 68 in each chain-link converter of each converter limb portion to control the configuration of the AC voltage at the AC terminal 36, the AC voltage being in the form of a sinusoidal AC voltage that includes the fundamental frequency AC voltage component, but not the $3^{rd}$ harmonic frequency alternating current component 70a,70b,70c. Therefore, the voltage source converter 22 is controlled to generate the fundamental frequency alternating current component at each AC terminal 36.

The $3^{rd}$ harmonic frequency alternating current component 70a,70b,70c at each AC terminal 36 is generated as follows.

Whilst the voltage source converter 22 is controlled to generate the fundamental frequency alternating current component at each AC terminal 36, the controller 100 controls the switching of the switching elements of each module 68 in the chain-link converter of each converter unit 80 to generate the $3^{rd}$ harmonic frequency AC voltage at the common junction 44 of the first star configuration to drive the flow of a $3^{rd}$ harmonic frequency alternating current component 70a,70b,70c at each AC terminal 36 and thereby drive a $3^{rd}$ frequency harmonic alternating current 72 to flow through the current return path 58 and in the third tap terminal 56.

Therefore, the voltage source converter 22 and converter units 80 are operated in combination to generate an alternating current flowing at the AC terminal 36, the alternating current including both fundamental and $3^{rd}$ harmonic frequency alternating current components 70a,70b,70c.

Separating each converter unit 80 from the voltage source converter 22 means that the voltage source converter 22 is not required to generate the $3^{rd}$ harmonic frequency alternating current component 70a,70b,70c at each AC terminal 36. Therefore, the voltage source converter 22 and converter units 80 can be optimised from a hardware and control perspective to perform their respective functions, thus improving the efficiency and reliability of the fourth electrical assembly 320.

It is envisaged that, in other embodiments of the invention, the fourth electrical assembly may include one of the converter units and omit the other of the converter units such that the remaining converter unit is connected to the common junction of the first star configuration or to the third tap terminal of the DC tap via the primary transformer winding of the second transformer.

It is envisaged that, in other embodiments of the invention, the configuration of the converter unit may vary as long as the converter unit is able to be controlled, in use, to generate the $3^{rd}$ harmonic frequency alternating current component at each AC terminal, and the connection of the converter unit to the voltage source converter in the electrical assembly may vary as long as the converter unit is able to be controlled, in use, to generate the $3^{rd}$ harmonic frequency alternating current component at each AC terminal to drive the $3^{rd}$ frequency harmonic alternating current to flow through the current return path and in the third tap terminal.

The invention claimed is:

1. An electrical assembly comprising:
a voltage source converter including first and second DC terminals and at least one AC terminal, the first and second DC terminals being respectively connectable to first and second DC power transmission media connected to a DC electrical network, the or each AC terminal being connectable to an AC electrical network;
a DC tap including first and second tap terminals, the first and second tap terminals being respectively connectable to the first and second DC power transmission media, the DC tap including a tap limb extending between the first and second tap terminals, the tap limb having first and second tap limb portions separated by a third tap terminal, each tap limb portion including a respective DC blocking capacitor, the third tap terminal being connectable to an electrical load;
a current return path configured to electrically interconnect the or each AC terminal to the third tap terminal;
a converter unit; and
a controller configured to selectively control the converter unit to generate at least one first non-fundamental frequency alternating current component at the or each AC terminal to drive a non-fundamental frequency alternating current to flow through the current return path and in the third tap terminal, and to selectively control the voltage source converter to modify the or each first non-fundamental frequency alternating current component at the or each AC terminal so as to form a first current flowing between the first DC terminal and the first tap terminal and to form a second current flowing between the second DC terminal and the second tap terminal, each of the first and second currents including a direct current component and at least one second non-fundamental frequency alternating current component, so as to enable the DC tap to draw power from the DC electrical network for supply to the electrical load.

2. An electrical assembly according to claim 1 wherein the controller is configured to selectively control the voltage source converter to generate a fundamental frequency alternating current component at the or each AC terminal while the converter unit generates the or each first non-fundamental frequency alternating current component at the or each AC terminal.

3. An electrical assembly according to claim 1 wherein the or each first non-fundamental frequency alternating current component is a harmonic frequency alternating current component.

4. An electrical assembly according to claim 1 wherein the or each first non-fundamental frequency alternating current component is a zero phase sequence alternating current component.

5. An electrical assembly according to claim 1 wherein the voltage source converter includes at least one converter limb extending between the first and second DC terminals, the or each converter limb having first and second converter limb portions separated by an AC terminal, each converter limb portion including at least one switching element, the or each switching element in each converter limb portion being switchable to switch the corresponding converter limb portion in and out of circuit between the AC terminal and the corresponding DC terminal to control the configuration of an AC voltage at the corresponding AC terminal.

6. An electrical assembly according to claim 5 wherein the controller is configured to selectively control switching of the switching elements in the converter limb portions to alternately switch the converter limb portions into circuit between the AC terminal and the corresponding DC terminal in a nominal 50:50 duty cycle.

7. An electrical assembly according to claim 5 wherein each converter limb portion includes at least one module, the or each module including at least one switching element and at least one energy storage device, the or each switching element and the or each energy storage device in the or each module combining to selectively provide a voltage source.

8. An electrical assembly according to claim 1 wherein the voltage source converter includes the converter unit.

9. An electrical assembly according to claim 5 wherein the voltage source converter includes the converter unit and wherein the converter unit includes the or each converter limb.

10. An electrical assembly according to claim 1 wherein the converter unit is separate from the voltage source converter.

11. An electrical assembly according to claim 10 wherein the current return path includes the converter unit.

12. An electrical assembly according to claim 10 wherein the converter unit includes at least one module, the or each module including at least one switching element and at least one energy storage device, the or each switching element and the or each energy storage device in the or each module combining to selectively provide a voltage source.

13. An electrical assembly according to claim 1 wherein the current return path includes at least one of:
- a ground return;
- an electrically conductive line or cable;
- an electrically conductive sheath for enclosing the or each DC power transmission medium;
- a lightning conductor.

14. An electrical assembly according to claim 1 including a plurality of phase elements connected in a star configuration in which a first end of each phase element is connected to a common junction, the current return path configured to electrically interconnect the common junction and the third tap terminal, the voltage source converter including a plurality of AC terminals, each AC terminal being connected to a second end of a respective one of the plurality of phase elements.

15. An electrical assembly according to claim 14 wherein each phase element includes a first transformer winding.

16. An electrical assembly according to claim 15 further including a plurality of second transformer windings, each first transformer winding being mutually coupled with a respective one of the plurality of second transformer windings, a first end of each second transformer winding being connected to a second end of a different second transformer winding such that the interconnection of the second transformer windings define a closed loop.

17. An electrical assembly according to claim 1 including at least one impedance element, the or each impedance element forming a current control element for controlling the or each first non-fundamental frequency alternating current component.

18. An electrical assembly according to claim 17 wherein the current return path includes at least one impedance element.

19. An electrical assembly according to claim 1 wherein the DC tap further includes a transformer, the third tap terminal being connectable to the electrical load via the transformer.

20. An electrical assembly according to claim 1 wherein the DC tap further includes a frequency converter.

21. An electrical assembly according to claim 20 wherein the frequency converter is a 1-phase to multi-phase frequency converter.

* * * * *